Figure 2:
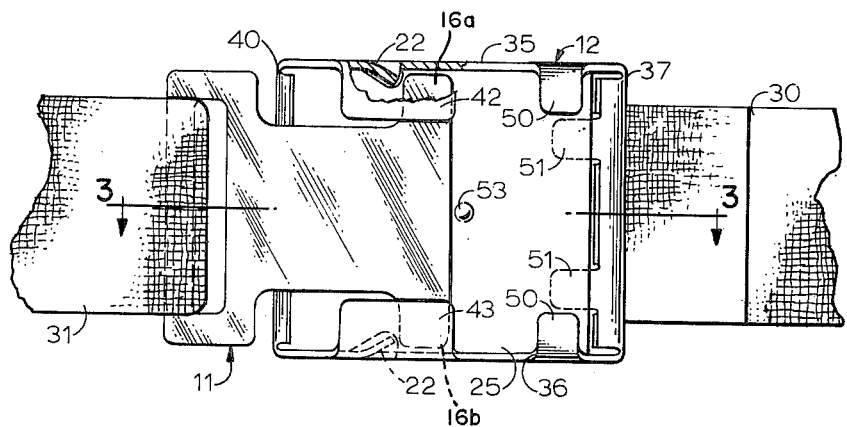

Aug. 17, 1965  M. N. MILLER  3,200,461

FASTENER DEVICE

Filed Dec. 2, 1963

INVENTOR.
MATTHEW N. MILLER
BY
*Edward P. Sokolski*
ATTORNEY

United States Patent Office 3,200,461
Patented Aug. 17, 1965

3,200,461
FASTENER DEVICE
Matthew N. Miller, Topanga, Calif., assignor to
Jay P. Freer
Filed Dec. 2, 1963, Ser. No. 327,397
6 Claims. (Cl. 24—201)

This invention relates to fastener devices and more particularly to such a device suitable for connecting two strap members together which has good holding capabilities yet which can easily be connected and disconnected.

Seat belts are used for safety purposes quite widely both in public transportation media such as aircraft and in private vehicles such as automobiles. The fastener device used with such a seat belt to perform its function properly must have excellent holding characteristics, yet at the same time must be capable of easy connection and disconnection. In order to achieve the necessary holding characteristics, most of the devices of the prior art utilize relatively cumbersome attachment and detachment mechanisms which require both hands to operate and which are generally of rather costly construction. Devices utilizing simple attachment schemes which are relatively easy to operate have genreally been unable to meet the performance tests required to qualify such devices as safe for the intended purposes.

The device of this invention overcomes the shortcomings of the prior art in providing a simple fastener device of relatively economical fabrication which can meet the most stringent safety requirements and yet which is extremely simple to operate. While devices of the prior art have been developed which can be released with one hand, none of these can be operated without utilizing both hands. In the device of the invention, both attachment and detachment of the fastener with one hand is possible.

In the device of the invention, the desired end result is achieved by utilizing a receptacle having a main body portion in which a resilient plate portion is mounted. The main body portion has a broad flat side and three relatively narrow sides extending therefrom. Two of these narrow sides are oppositely positioned and have inwardly extending projections thereon and a pair of flanges extending inwardly therefrom towards each other. The flat resilient plate portion has a projection extending above the broad surface thereof.

A connector member to which one of the strap members is attached has a pair of arms which attach to the receptacle member and are held between the projection on the plate portion and the flanges extending from the opposite sides of the main portion of the receptacle. The connector member in its connection to the receptacle member is positioned so that its arms are drawn under the flanges extending from the sides of the receptacle and held in place between such flanges and the resilient plate portion, locked between the projection extending from the plate portion and the projections extending from the opposite sides. The connector member is released from the receptacle member by depressing its face and along with it the resilient plate portion so that its arms ride under the projections extending from the opposite sides. Thus, good holding action is provided combined with ready connection and disconnection of the holding members.

It is therefore an object of this invention to provide an improved fastener device.

It is a further object of this invention to provide a fastener device of simple construction having good holding capabilities.

It is a further object of this invention to provide a fastener device which is capable of easy connection and disconnection.

It is a still further object of this invention to provide a fastener device of economical fabrication.

Figure 3:
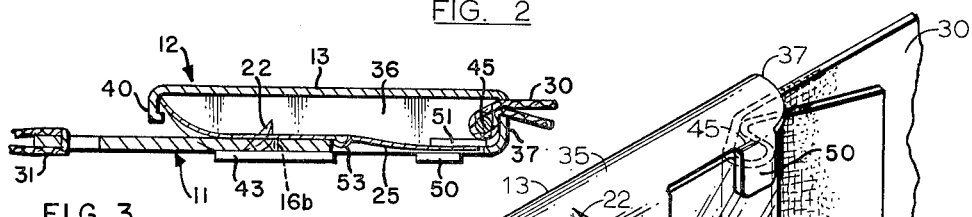
Figure 1:
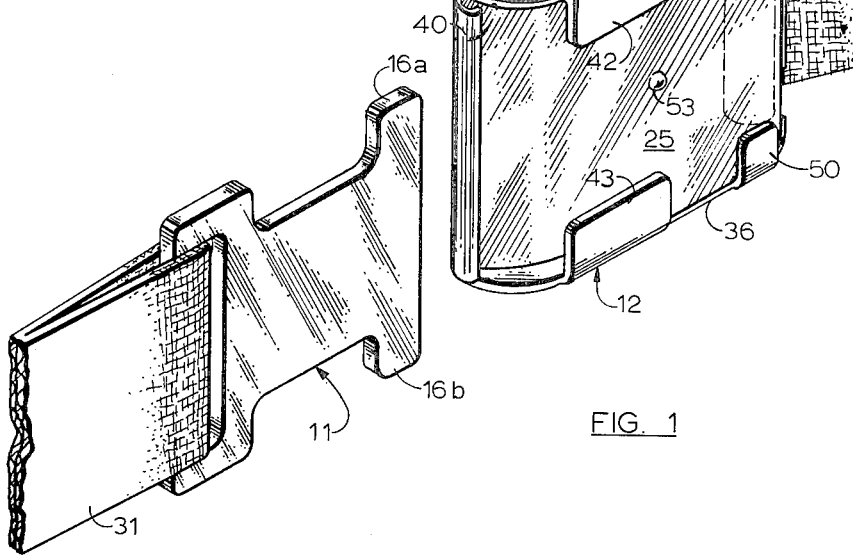

Other objects of this invention will become apparent from the following description taken in connection with the accompanying drawings of which FIG. 1 is a perspective view of a preferred embodiment of the device of the invention in a disconnected condition, FIG. 2 is a top view of the preferred embodiment of the invention illustrated in FIG. 1, and FIG. 3 is a sectional view taken on line 3—3 of FIG. 2.

Referring now to the figures, receptacle member 12 comprises a broad flat side 13 and two relatively narrow sides 35 and 36 and another relatively narrow side or a back wall 37 extending therefrom in planes substantially perpendicular to the broad surface of side 13. Sides 35 and 36 are oppositely positioned and have a pair of projections 22 formed therein which extend inwardly towards each other. As shown in the drawing, the projections 22 are cut from and bent inwardly from the opposed sides 35 and 36 to thereby leave an opening in each of the opposed sides. The projections 22 are spaced from the broad flat side 13 as shown in FIGS. 1 and 3.

Sides 35 and 36 also have a pair of elongated flanges 42 and 43 intermediate their ends extending inwardly therefrom towards each other. Strap 30, which is preferably a seat belt strap, is attached to pin member 45 mounted on one end of the receptacle.

Resilient plate 25 is retained in the main body portion of receptacle 12 by means of flanges or holder flanges 50 which extend inwardly from sides 35 and 36 of the receptacle and flanges or holder flanges 51 which extend inwardly from side 37 operating in conjunction with elongated narrow flange 40 which extends along an edge of broad side 13. Resilient plate 25 is arcuate and curves generally diagonally rearwardly from flange 40 approaching to within close proximity to the rearward ends of flanges 42 and 43 and then continues towards the top edges of side 37 where it is retained between flanges 51 and 50. Resilient plate portion 25 has a projection or protrusion 53 in the form of a raised dimple which extends upwardly from the broad surface of the resilient plate. Raised dimple 53 is located substantially mid way between sides 35 and 36.

Connector member 11 is substantially H shaped and has a strap 31, preferably a seat belt strap, connected to one end thereof and a pair of outwardly extending arms 16a and 16b at the other end thereof.

The thickness of the connector unit 11 is not particularly critical; however, it must be sufficiently thick to withstand the force exerted thereon in normal usage. It should also have a thickness which will permit it to be clamped between the resilient plate 25 and the flanges 42 and 43 in the locking position as shown in FIG. 3.

In operating the fastener, arms 16a and 16b are placed on resilient plate 25 between flanges 42, 43 and flanges 50. The resilient plate 25 is depressed and the connector member 11 is then drawn back or moved to the left as viewed in FIGS. 2 and 3 to bring arms 16a and 16b under the edges of flanges 42 and 43. This can generally be achieved with one hand in view of the holding action of strap 30 on receptacle 12 as connector member 11 is drawn therein. Arms 16a and 16b fit under the edges of flanges 42 and 43 depressing resilient plate member 25 as they are drawn between it and the flanges. Arms 16a and 16b finally come to rest and are snapped in place or into a locking position between projections 22 extending from the sides of the receptacle and projection 53 extending upwardly from the resilient plate as shown in FIG. 2. Arms 16a and 16b are held between the projections and are prevented from moving out of such position thereby. The pulling action of straps 30 and 31 causes arms 16a and 16b to lodge firmly against projections 22. The connector member is prevented from rotating downwardly to any significant degree by flange 40 which extends upwardly from the main body portion and forms an abutment. This aids in avoiding inadvertent separation of the members. In the locking position shown in FIG. 3, the connector unit 11 terminates short of the back wall 37 and is engageable with the abutment.

The buckle can readily be released merely by pressing downwardly on the face of connector member 11 forcing it towards broad surface 13, thereby depressing resilient plate 25 intermediate its ends and allowing the edges of arms 16a and 16b to pass beneath projections 22. Such depression cannot be effected by a force exerted on straps 31 and 30 where the holding action is provided. It can only be effected by depression of the face of the connector member which could only normally be accomplished by positive finger action.

The device of the invention thus provides a simple yet highly effective fastener device which while capable of ready connection and disconnection has excellent holding characteristics. Both attachment and detachment are achieved by moving the connector member in the same direction, thus permitting both connection and disconnection with one hand.

While the device of the invention has been described and illustrated in detail, it is to be clearly understood that this is intended by way of illustration and example only and is not to be taken by way of limitation, the spirit and scope of this invention being limited only by the terms of the following claims.

I claim:

1. A fastener having locking and releasing positions for a seat belt comprising:
   a receptacle including a relatively broad side, first and second spaced opposed sides extending from said broad side in generally the same direction, said opposed sides having flanges extending inwardly therefrom and also projections extending inwardly adjacent the inner faces of said flanges, said flanges being spaced longitudinally from one end of said fastener, thereby providing gaps;
   a resilient plate in said receptacle;
   first retaining means adjacent said one end of said fastener for retaining one end of said resilient plate spaced outwardly from said broad side;
   second retaining means secured to said broad side at the other end of the fastener for retaining the other end of said resilient plate closely adjacent said broad side, said resilient plate in said locking and in said releasing positions extending generally diagonally between said first and said second retaining means; and
   a connector unit including a plate having a pair of outwardly extending arms positionable between said projections and said back wall and engageable with said projections and said flanges in said locking position, said arms being movable through said gaps into said locking position, said fastener assuming said releasing position by application of pressure to said resilient plate to cause deflection thereof intermediate said ends of said resilient plate.

2. A fastener having locking and releasing positions for a seat belt comprising:
   a receptacle including a relatively broad side, first and second spaced opposed sides extending from said broad side in generally the same direction, a back wall extending from said broad side between said opposed sides at one end of the fastener, each of said opposed sides having a flange and a projection extending inwardly therefrom, said projections being adjacent the inner faces of said flanges and spaced longitudinally from said back wall, thereby providing gaps;
   a resilient plate in said receptacle;
   retaining means adjacent said back wall for retaining one end of said resilient plate near the edge of said back wall remote from said broad side;
   a flange retainer secured to said broad side at the other end of the fastener for retaining the other end of said resilient plate closely adjacent said broad side, said resilient plate in both of said positions extending generally diagonally between said retaining means and said flange retainer;
   a connector unit including a plate having a pair of outwardly extending arms positionable between said projections and said back wall and engageable with said projections and said flanges in said locking position, said arms being movable through said gaps into said locking position; and
   means for releasably retaining said arms in engagement with said projections in said locking position, said fastener assuming said releasing position by application of pressure to said resilient plate to cause deflection thereof intermediate said ends of said resilient plate.

3. A fastener having locking and releasing positions for a seat belt comprising:
   a receptacle including a relatively broad side, first and second spaced opposed sides extending from said broad side in generally the same direction, a back wall extending from said broad side between said opposed sides at one end of the fastener, said opposed sides having flanges extending inwardly from the edges thereof and inwardly extending projections intermediate the ends of said opposed sides, said projections being adjacent the inner faces of said flanges and spaced longitudinally;
   a resilient plate in said receptacle;
   retaining means adjacent said back wall for retaining one end of said resilient plate near the edge of said back wall remote from said broad side;
   a flange retainer secured to said broad side at the other end of the fastener for retaining the other end of said resilient plate closely adjacent said broad side and forming an abutment, said resilient plate in both of said positions curving generally diagonally between said retaining means and said flange retainer;
   a connector unit including a plate having a pair of outwardly extending arms positionable between said projections and said back wall and engageable with said projections and said flanges in said locking position, said arms being movable through said gaps into said locking position; and
   means on said resilient plate spaced from said back wall and engageable with said connector unit to releasably retain said arms in engagement with said projections in said locking position, said connector unit terminating short of said back wall and being engageable with said abutment in said locking position, said fastener assuming said releasing position by application of pressure to said resilient plate to cause deflection thereof intermediate said ends of said resilient plate.

4. A fastener having locking and releasing positions for a seat belt comprising:
   a receptacle including a relatively broad side, first and second spaced opposed sides extending from said broad side in generally the same direction and generally normal thereto, a back wall extending from said broad side between said opposed sides at one end of the fastener, said first and second opposed sides having flanges intermediate their ends extending inwardly from the edges thereof and inwardly extending projections intermediate the ends of said flanges, said projections being cut from and bent inwardly from said opposed sides to thereby leave an opening in each of said opposed sides, said projections being adjacent the inner faces of said flanges and spaced longitudinally from said back wall, thereby providing gaps;

a resilient plate in said receptacle;

retaining means adjacent said back wall for retaining one end of said resilient plate near the edge of said back wall remote from said broad side;

second retaining means secured to said broad side at the other end of the fastener for retaining the other end of said resilient plate closely adjacent said broad side, said resilient plate in both of said positions extending generally diagonally between said first and second retaining means;

a connector unit including a generally flat plate having a pair of outwardly extending arms positionable between said projections and said back wall and engageable with said projections and said flanges in said locking position, said arms being movable through said gaps into said locking position, said connectors unit terminating short of said back wall in said locking position; and a dimple on said resilient plate spaced from said back wall and extending away from said broad side, said dimple being engageable with said connector unit to releasably retain at least a portion of said connector unit between said dimple and said inwardly extending projections in said locking position, said fastener assuming said releasing position by application of pressure to said resilient plate to cause deflection thereof intermediate said ends of said resilient plate.

5. A fastener having locking and releasing positions for a seat belt comprising:

a receptacle including a relatively broad side, first and second spaced opposed sides extending from said broad side in generally the same direction, a back wall extending from said broad side between said opposed sides at one end of the fastener, said opposed sides having flanges extending inwardly from the edges thereof and inwardly extending projections, said projections being adjacent the inner faces of said flanges and spaced longitudinally from said back wall, thereby providing gaps, said receptacle having a pin for attachment to a seat belt strap extending between said opposed sides adjacent said back wall;

a resilient plate in said receptacle;

retaining means adjacent said back wall for retaining one end of said resilient plate near the edge of said back wall remote from said broad side;

a flange retainer secured to said broad side at the other end of the fastener for retaining the other end of said resilient plate closely adjacent said broad side, said resilient plate in both of said positions extending generally diagonally between said retaining means and said flange retainer;

a connector unit including a plate having a pair of outwardly extending arms positionable between said projections and said back wall and engageable with said projections and said flanges in said locking position, said arms being movable through said gaps into said locking position, said connector unit terminating short of said back wall when in said locking position; and means on said resilient plate spaced from said back wall and engageable with said connector unit to releasably retain said arms in engagement with said projections in said locking position, said fastener assuming said releasing position by application of pressure to said resilient plate to cause deflection thereof intermediate said ends of said resilient plate.

6. A fastener having locking and releasing positions for a seat belt comprising:

a receptacle including a relatively broad side, first and second spaced narrow opposed sides extending generally perpendicularly from said broad side in generally the same direction, a narrow back wall extending generally perpendicularly from said broad side between said opposed sides at one end of the fastener, said opposed sides having flanges generally parallel to said broad side and extending inwardly from the edges of said opposed sides intermediate the ends thereof, said opposed sides having inwardly extending projections intermediate the ends thereof, said projections being adjacent the inner faces of said flanges and spaced longitudinally from said back wall, thereby providing gaps, said receptacle having a pin for attachment to a strap extending between said opposed sides adjacent said back wall;

a resilient plate in said receptacle;

retaining means adjacent said back wall for retaining one end of said resilient plate near the edge of said back wall remote from said broad side, said retaining means including holder flanges extending inwardly from said edge of said back wall and from the edges of said opposed sides to clamp said one end of said resilient plate;

a flange retainer integral with said broad side at the other end of the fastener for retaining the other end of said resilient plate closely adjacent said broad side, said flange retainer extending from said broad side a lesser distance than said back wall and forming an abutment, said resilient plate in both of said positions curving generally diagonally between said retaining means and said flange retainer means;

a connector unit including a generally flat plate having a pair of outwardly extending arms positionable be-between said projections and said back wall and engageable with said projections and said flanges in said locking position, said arms being movable through said gaps into said locking position, said connector unit terminating short of said back wall and being engageable with said abutment in said locking position;

a protrusion on said resilient plate spaced from said back wall and engageable with said connector unit to releasably retain at least a portion of said connector unit between said protrusion and said inwardly extending projections in said locking position, said fastener assuming said releasing position by application of pressure to said resilient plate to cause deflection thereof intermediate said ends of said resilient plate;

a first seat belt strap secured to said pin; and a second seat belt strap secured to said connector unit.

References Cited by the Examiner

UNITED STATES PATENTS

| | | | |
|---|---|---|---|
| 381,833 | 4/88 | Fried | 24—230 |
| 462,914 | 11/91 | Pilkington | 24—230 |
| 530,318 | 12/94 | Adams | 24—230 |
| 811,494 | 1/06 | Freeman | 24—230 |
| 1,044,024 | 11/12 | Tinsley | 24—17 |

FOREIGN PATENTS 567,220   10/57   Italy.

WILLIAM FELDMAN, *Primary Examiner.*

DONLEY J. STOCKING, *Examiner.*

UNITED STATES PATENT OFFICE
CERTIFICATE OF CORRECTION

Patent No. 3,200,461                                    August 17, 1965

Matthew N. Miller

It is hereby certified that error appears in the above numbered patent requiring correction and that the said Letters Patent should read as corrected below.

Column 4, line 34, after "longitudinally" insert -- from said back wall, thereby providing gaps --; column 5, line 19, for "connectors" read -- connector --.

Signed and sealed this 8th day of March 1966.

(SEAL)
Attest:

ERNEST W. SWIDER                            EDWARD J. BRENNER
Attesting Officer                                  Commissioner of Patents